United States Patent
Lee et al.

(10) Patent No.: US 7,630,707 B2
(45) Date of Patent: Dec. 8, 2009

(54) WIRELESS COMMUNICATION OUT OF RANGE INDICATION

(75) Inventors: Michael M. Lee, San Jose, CA (US); Christopher McKillop, La Honda, CA (US); Stephan Vincent Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 11/563,655

(22) Filed: Nov. 27, 2006

(65) Prior Publication Data

US 2008/0125106 A1  May 29, 2008

(51) Int. Cl.
*H04W 4/00* (2006.01)
(52) U.S. Cl. .................. 455/421; 455/422.1
(58) Field of Classification Search .......... 455/421, 455/422.1
See application file for complete search history.

(56) References Cited

U.S. PATENT DOCUMENTS

| | | | | |
|---|---|---|---|---|
| 5,134,708 A * | 7/1992 | Marui et al. | ................ | 455/421 |
| 5,809,414 A | 9/1998 | Coverdale et al. | | |
| 6,188,890 B1 * | 2/2001 | Chang | ................ | 455/421 |
| 6,298,233 B1 * | 10/2001 | Souissi et al. | ................ | 455/423 |
| 6,349,206 B1 * | 2/2002 | Reichelt et al. | ................ | 455/421 |
| 6,597,906 B1 * | 7/2003 | Van Leeuwen et al. | ... | 455/422.1 |
| 6,721,572 B1 * | 4/2004 | Smith et al. | ................ | 455/456.1 |
| 7,076,245 B1 * | 7/2006 | Satapathy | ................ | 455/421 |
| 7,203,487 B2 * | 4/2007 | Comp | ................ | 455/422.1 |
| 2004/0097230 A1 * | 5/2004 | Natarajan et al. | ........... | 455/436 |

OTHER PUBLICATIONS

Specification of the Bluetooth System Master Table of Contents & Compliance Requirements, Covered Core Package version 2.0 + EDR, issued Nov. 4, 2004.
L2CAP Layer Tutorial, Logical Link control and Adaptation Protocol, downloaded Oct. 18, 2006, http://www.palowireless.com/infotooth/tutorial/l2cap.asp.
Logical Link Control and Adaptation Protocol Specification, Host volume, Part A; Bluetooth Specification Version 2.0 +EDR vol. 4 pp. 16-110, Nov. 4, 2004.
Bluetooth Specification Version 2.0 + EDR vol. 1, pp. 30-31, Nov. 4, 2004.
Bluetooth Specification Version 2.0 + EDR vol. 3, pp. 137-152, Nov. 4, 2004.
Bluetooth Specification Version 2.0 + EDR vol. 1, p. 50. Nov. 4, 2004.

* cited by examiner

*Primary Examiner*—Vincent P Harper
*Assistant Examiner*—Marivelisse Santiago-Cordero
(74) *Attorney, Agent, or Firm*—Beyer Law Group LLP (57) ABSTRACT

With respect to a wireless network, an out of range warning provides an estimate of an amount of time remaining until a wireless device is out of range of the wireless network. In this way, the user is presented with an opportunity to take corrective measures, if desired.

33 Claims, 7 Drawing Sheets

WIRELESS COMMUNICATION OUT OF RANGE INDICATION

BACKGROUND OF THE INVENTION

1. Field of Invention

This invention relates in general to wireless networks and more particularly to providing an out of range indication.

2. Description of Related Art

Recent developments in consumer electronics have included the introduction of wireless personal communication devices such as cell phones, personal walkie-talkies, PDAs (Personal Digital Assistants) and other portable electronic devices. Such devices can be used in many places to wirelessly connect to the Internet, play games, email and other messaging functions as well as provide for personal communications.

Many factors can influence the quality of communications received and/or transmitted to/from a wireless device, including geography, weather, physical obstacles such as foliage and buildings, battery power etc. For example, buildings and other structures can cause interference with the desired communication signals. Such interference typically depends on the method of construction used and the design of the building or other structures and other factors. A user's distance from a transceiver can also result in poor signal quality that can result in unexpected (and annoying) dropped calls, for example.

In order to provide notice of poor signal quality, some wireless devices have a one-way signal strength indicator that is a rough estimator of quality of the radio frequency signal between the covering base station and the receiving wireless device. For example, U.S. Pat. No. 5,809,414 to Coverdale et al. selectively provides to a user a signal strength indication using one or more pre-selected criteria. Unfortunately, however, this signal strength indicator provides the user with an indication of the signal quality only at that particular moment in time which is usually too late to take corrective measures in order to avoid the lost wireless signal or at least mitigate the effects of the lost signal when, or if, it occurs.

Therefore, what is desired is an out of range indication suitable for use in a wireless network.

SUMMARY OF THE INVENTION

The invention pertains to methods and systems for providing an out of range warning to a user of a wireless device in a wireless network. In one embodiment, the out of range warning can provide an estimate of an amount of time remaining until the wireless device is out of range of the wireless network. In this way, the user is presented with an opportunity to take corrective measures, if desired.

The invention can be implemented in numerous ways, including as a method, system, device, apparatus, consumer product, or computer readable medium. Several embodiments of the invention are discussed below.

As a method for providing an out of range warning by a wireless device with respect to a wireless network, one embodiment of the invention includes at least the acts of: receiving a wireless transmission; determining a current quality metric for the received wireless transmission; estimating a period of time until the wireless device is out of range of the wireless network; and issuing the out of range warning that includes the estimated period of time.

As computer program product, one embodiment of the invention includes at least: computer code for receiving a wireless transmission; computer code for determining a current quality metric for the received wireless transmission; computer code for estimating a period of time until the wireless device is out of range of the wireless network; computer code for issuing the out of range warning that includes the estimated period of time; and computer readable medium for storing the computer code.

As an apparatus, one embodiment of the invention includes a receiving unit arranged to receive a wireless transmission. The apparatus also includes a processing unit coupled to the receiving unit arranged to determine a current quality metric for the received wireless transmission, estimate a period of time until the wireless apparatus is out of range of the wireless network, and issue the out of range warning that includes the estimated period of time.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings

DETAILED DESCRIPTION OF SELECTED EMBODIMENTS

Reference will now be made in detail to selected embodiments of the invention an example of which is illustrated in the accompanying drawings. While the invention will be described in conjunction with a selected embodiments, it will be understood that it is not intended to limit the invention to one particular embodiment. To the contrary, it is intended to cover alternatives, modifications, and equivalents as may be included within the spirit and scope of the invention as defined by the appended claims.

The embodiments described herein provide a human observable out of range warning to a user of a mobile wireless device that the user is moving out of range of a wireless network. Such warnings can take many forms, such as a vibratory warning, audible warning, visual, etc. A particularly useful embodiment provides in addition to the human observable out of range indication, an estimate of an amount of time remaining until the user is projected to be out of range if no corrective action is taken. It should be noted that the term "projected to be out of range" could be defined in any number of ways. For example, in the context of a cellular telephone, "projected to be out of range" can be taken as the probability of dropping a call is greater than a pre-selected threshold (>98%, for example).

In the described embodiments, both the out of range warning and the estimate of time remaining until the user is projected to be out of range are based upon characterizing the time dependent behavior of wireless signal quality parameters. In those cases where the time dependent behavior indicates that the mobile wireless device is moving from a region of higher wireless signal quality to a region of lower wireless signal quality, an estimate of the amount of time until the wireless device is projected to be out of range is calculated and compared to a pre-determined threshold. If the estimated amount of time until the wireless device projected to be out of range is less than the threshold, a tangible warning is issued to that effect. In some embodiments, the tangible warning not only notifies the user of the wireless device of the impending loss of signal, but also if no corrective action is taken, how long before the signal is effectively lost. In this way, warnings are only issued for those situations where the loss of signal would affect the user in the here and now and thereby prevent unnecessary (and potentially annoying) warnings being issued. It should also be noted that in a number of embodiments, the status of the wireless device (active vs. inactive) can be taken into account in deciding whether or not to issue the warning and under what conditions. Clearly if the wireless device is active, then more stringent timing requirements would be necessary as opposed to those situations when the wireless device is inactive (such as in a standby mode). In some embodiments (such as those involving communication devices such as cell phones, PDAs, etc.), the warning can be wirelessly transmitted to any other person currently in communication with the user of the wireless device indicating that the call may be dropped. The invention is also well suited to be incorporated with mobile devices that are equipped with guidance systems (GPS, accelerometers, etc.) thereby providing an accurate value of the location, velocity, acceleration, elevation, etc. of the wireless mobile device that can be used to give a more precise value of the time remaining until the out of boundary condition is reached.

The embodiments will now be described in the context of a wireless device that can be either digital or analog in nature. Such devices can include a pocket sized cell phone that in addition to the standard voice function of a telephone can support many additional services such as SMS for text messaging packet switching for access to the Internet and MMS for sending and receiving photos and video. The wireless device can also include personal digital assistants (PDAs), wireless multimedia players, and the like.

Figure 1:
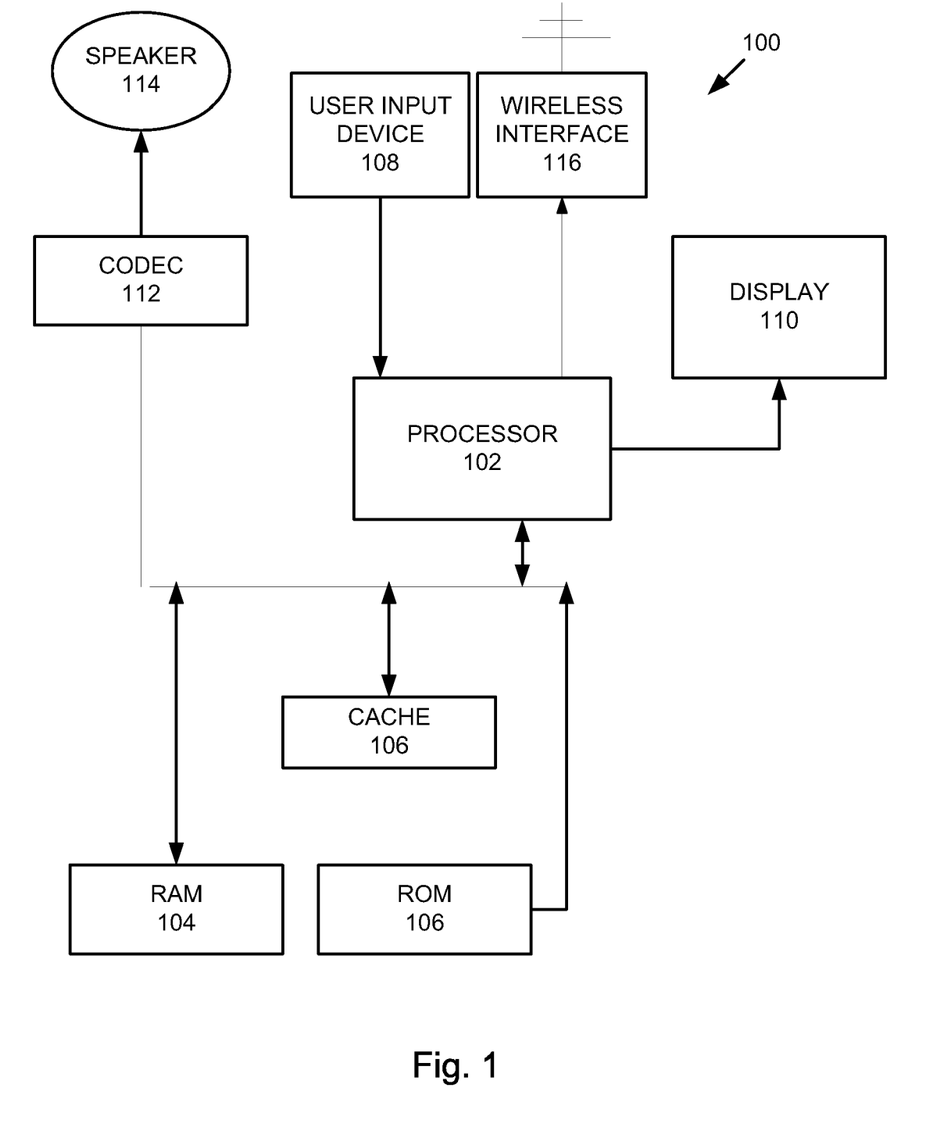
FIG. 1 shows representative wireless device (such as a cell phone) in accordance with an embodiment of the invention.

FIG. 1 shows representative wireless device 100 (such as a cell phone) in accordance with an embodiment of the invention. As a cell phone, wireless device 100 includes processor 102 that pertains to a microprocessor or controller for controlling the overall operation of wireless device 100 that stores data in RAM 104 and Read-Only Memory (ROM) 106. ROM 106 can store programs, utilities or processes to be executed in a non-volatile manner whereas RAM 104 provides volatile data storage such as currently called phone numbers, ring tones, etc. Wireless device 100 also includes user input device 108 that allows a user to interact with wireless device 100. For example, user input device 108 can take a variety of forms, such as a button, keypad, dial, etc. Still further, wireless device 100 includes display 110 (screen display) that can be controlled by processor 102 to display information to the user. A data bus can facilitate data transfer between at least ROM 106, RAM 104, processor 102, and CODEC 112 that produces analog output signals for audio output device 114 (such as a speaker). Speaker 114 can be located internal to wireless device 100 or external to wireless device 100. For example, headphones or earphones that connect to wireless device 100 would be considered an external speaker. Wireless interface 116 operates to receive information from processor 102 that opens a wireless channel (either voice or data) for transmission and reception using, for example, RF carrier waves, infrared (IR) signals, etc.

Figure 2:
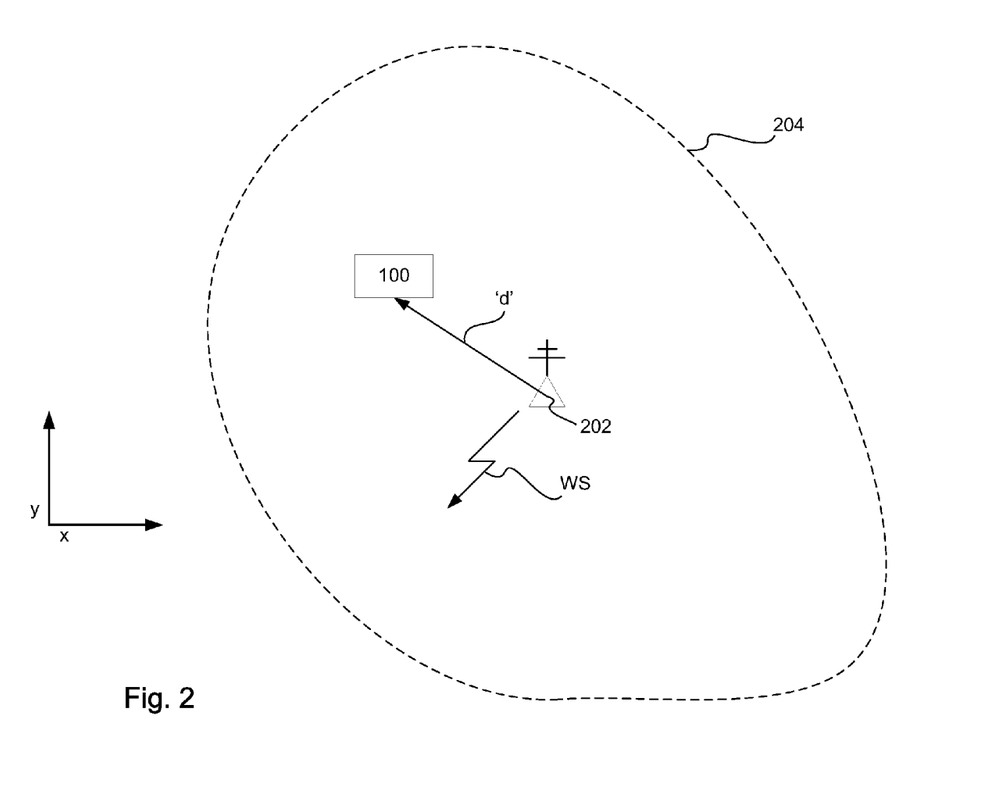
FIG. 2 shows representative wireless network having base station in wireless communication with wireless device of FIG. 1 in accordance with an embodiment of the invention.

FIG. 2 shows representative wireless network 200 having base station 202 in wireless communication with wireless device 100 in accordance with an embodiment of the invention. It should be noted that wireless network 200 can utilize any appropriate wireless technology such as radio-frequency (also referred to as RF that includes WiFi, Bluetooth, GCS, PCM, etc.) or optical (Infrared also referred to as IR), etc. In the described embodiment, base station 202 transmits wireless signal WS having signal strength S that (in the case of both RF and optical signals) on the average varies inversely with the square of distance d (i.e., $S \propto 1/d^2$) from base station 202. It should be noted that other factors can also affect signal strength S. Such factors include but are not limited to the local terrain, local weather, physical obstacles such as buildings, power lines, and so on. However, for sake of simplicity only, it is assumed for the present discussion that no such factors are present and the only variation in signal strength S is due to distance d from base station 202.

Typically, the quality of wireless signal S (referred to hereinafter as QoWS) at a receiver decreases as the distance between the receiver and a transmitter increases. In particular, if QoWS as a measure of the reliability and usability of wireless network 200 is related to signal strength S (i.e., QoWS tracks S), QoWS is then (approximately) inversely related to distance d from base station 202 as Eq. (1):

$$QoWS \propto 1/d^2. \quad\quad\quad Eq. (1)$$

It should be noted, however, that in more general terms, QoWS is related to distance d as Eq. (2):

$$QoWS \propto 1/d^m \quad\quad\quad Eq. (2)$$

where the value of m depends upon the underlying network quality metric used to generate QoWS. For example, if wireless network 200 is a cellular telephone network (where QoWS is typically taken from a user's viewpoint), one can base QoWS for such a network on a quality metric referred to as coverage where signal strength S is measured using test equipment that, in turn, can be used to estimate the size of the cell. In this case, therefore, m≅2 and QoWS closely tracks signal strength S throughout network 200 when configured as a cellular telephone network.

However, since the choice of underlying quality metric(s) depends upon many factors not the least of which include the type of network (cellular telephone, broadband, etc.), what is deemed to be the most appropriate quality metric to be used may or may not be tightly coupled to signal strength S. For example, as discussed above, cellular telephone networks can utilize signal strength S as an underlying quality metric (i.e., coverage) whereas a broadband type network (such as WiFi, Bluetooth, etc.) can be characterized using QoWS based upon the probability of packet losses or delays in already accepted calls and the probability that a new incoming call will be rejected. In this case, QoWS can have a very different relationship to distance d from base station 202 and the value of m can only be determined empirically.

In those cases where QoWS is, on average, inversely proportional to $d^m$, m is an empirically determined real number between 2 and 4 and "average" is understood to mean a spatial or ensemble average taken over a collection of possible locations for the wireless device, such that all locations in this collection are similar to the present location with regards to distance, local terrain, weather, obstacles, and proximity of the device to the user's body parts. However, if QoWS is computed in some other way (such as in the Bluetooth embodiment described below) then the inverse power-law model is unlikely to hold at all and an empirically derived relationship is more appropriate.

Accordingly, in one embodiment of the invention, wireless network 200 can be characterized based upon an underlying quality metric that is directly related to signal strength S (much like coverage for a cellular telephone network). In particular, wireless network 200 is characterized in terms of spatially dependent quality of wireless signal QoWS(d), where 'd' is the distance from the base station (it should be noted that in Cartesian coordinates, $d^2=x^2+y^2$). Using this convention, as distance d between wireless device 100 and base station 202 increases, QoWS(d) decreases until at boundary 204, QoWS(d) is so low that effective wireless communication between wireless device 100 and base station 202 is unlikely. In the parlance of a cellular telephone network, the call has been dropped and a new communication link must be established in order to continue the conversation (that may or may not be possible in the given circumstances). Clearly this is an annoying situation at best and should be avoided if at all possible.

Figure 3:
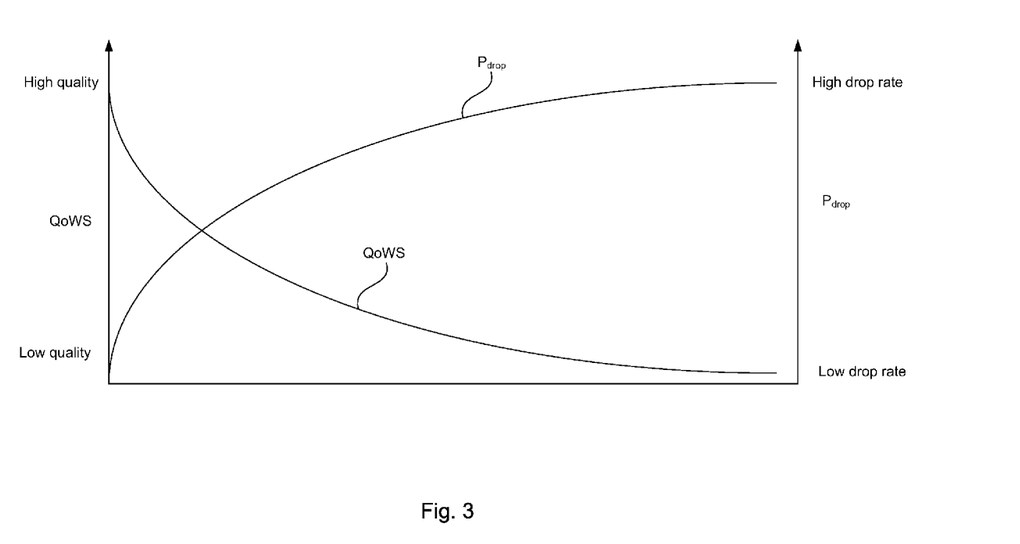
FIG. 3 and FIG. 6 show a relationship between QoWS(d) and probability of dropping a call $P_{drop}$ in accordance with an embodiment of the invention.

In this way, QoWS(d) provides a measure of the likelihood that a stable communication link can be established and maintained between base station 202 and wireless device 100. FIG. 3 shows a representative relationship between QoWS(d) and call drop probability $P_{drop}$ in accordance with an embodiment of the invention. Since there is an inverse relationship between QoWS(d) and call drop probability $P_{drop}$, if QoWS (d) is high, then probability $P_{drop}$ is low since there is a high probability that a stable communication link between base station 202 and wireless device 100 can be both established and maintained and therefore the number of dropped calls is concomitantly low. However, if QoWS(d) is low, then call drop probability $P_{drop}$ is high since a stable communication link can not, in all probability, be established in the first place or if established will not be sustainable due to low signal to noise ratio (S/N) for an analog network or a large number of dropped packets in a digital network, for example, resulting in a high likelihood of dropped calls.

Figure 4:
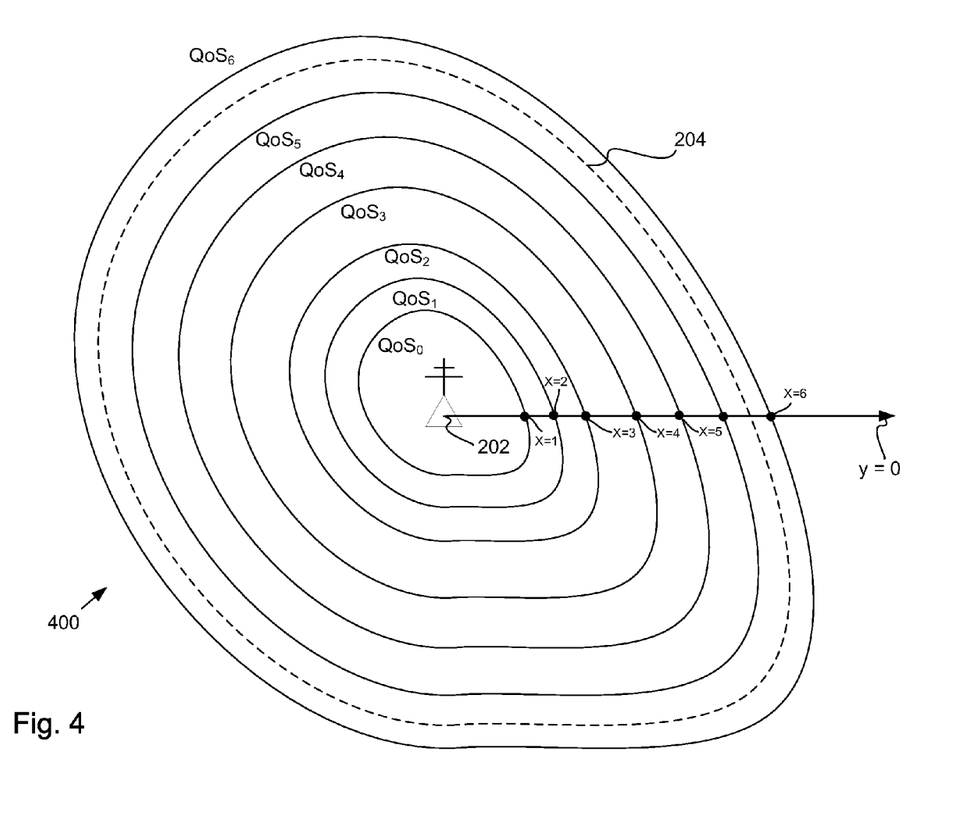
FIG. 4 illustrates a representative contour map of QoWS(d) using lines of constant QoWS(n) in accordance with an embodiment of the invention.

FIG. 4 illustrates a representative contour map 400 of QoWS(d) using lines of constant QoWS(n) in accordance with an embodiment of the invention. For example, QoWS(0) represents a baseline value QoWS for all wireless devices 100 located at baseline distance do whereas QoWS(1) represents a lower value of QoWS for all wireless devices 100 located at distance $d_1$ and so on until at distance $d_6$ (QoWS (6) in this example) is reached that any further characterization is pointless since it is beyond boundary 204 being the effective range of wireless network 200. It should be noted that the distance between contours line is not necessarily equal.

Figure 5:
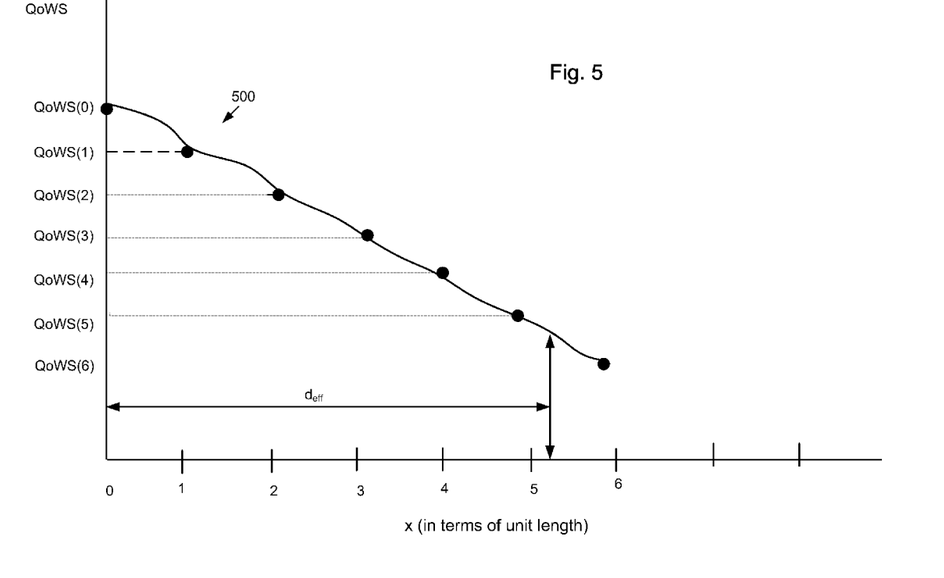
FIG. 5 shows a simplified "slice" of contour map of FIG. 4 in accordance with an embodiment of the invention.

When wireless device 100 is effectively immobile (such as a desktop computer in a local WiFi network), the positioning of wireless device 100 in order to optimize QoWS can be accomplished simply by determining the particular value of d that coincides with a local maximum value of QoWS. However, in the context of the present embodiment, wireless device 100 is a mobile wireless device, such as a cellular telephone, PDA, etc. where the contours of wireless network 200 are unknown to a user and therefore can not be relied upon to "cherry pick" a location for optimal reception. If it is assumed that signal strength S is constant, any change in QoWS experienced by mobile wireless device 100 is due only to changes in the spatial distribution of QoWS. For example, FIG. 5 shows a simplified "slice" 500 of contour map 400 in accordance with an embodiment of the invention. By slice it is meant that only those values of contour map 400 located on a plane surface (such as y=0 in this case) are shown thereby greatly simplifying the analysis. As shown, as wireless device 100 moves out from base station 202, QoWs(d) is a steadily decreasing function. More specifically, $$QoWS(0) > QoWS(1) > QoWS(2) > QoWS(3) \ldots > QoWS(6). \qquad \text{Eq. (3)}$$

Therefore, by keeping track of and comparing current QoWS (k) with previous QoWS (k−1) over time, a rate of change of QoWS can be estimated that can be used to determine if mobile wireless device 100 is approaching boundary 204 and how fast. For example, if mobile wireless device 100 is moving from a region of relatively higher QoWS to a region of relatively lower QoWS (representing a trend to decreasing QoWS), then there is a possibility that if the trend continues long enough, mobile wireless device 100 will reach and even cross boundary 204 with a likely loss of signal.

Figure 6:
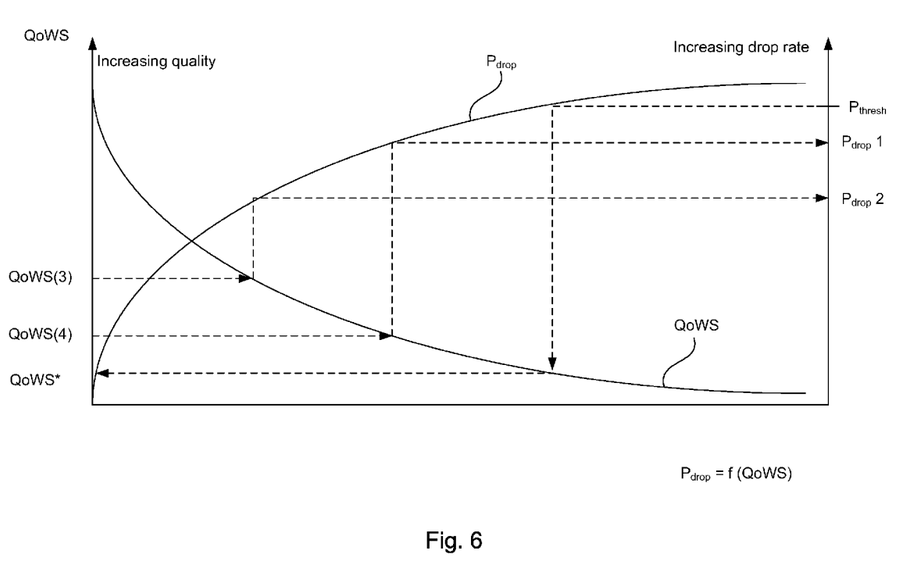

For example (referring to FIG. 5), if mobile wireless device 100 has moved from location x=4 at time $t_0$ to location x=3 at time $t_1$ (towards base station 202) then it can be inferred that mobile wireless device 100 is moving from a region of lower QoWS to one of higher QoWS (since QoWS(4)<QoWS (3)) and therefore no out of range warning is necessary. However, if mobile wireless device 100 has moved from location x=3 at time $t_0$ to location x=4 at time $t_1$ (away from base station 202) then it can be inferred that mobile wireless device 100 is moving from a region of higher QoWS to one of lower QoWS and therefore an out of range warning may be necessary since as illustrated in FIG. 6, any change in QoWS results in a commensurate change in call drop probability $P_{drop}$. For example, when wireless device 100 is moving away from base station 202 into a region of comparatively lower QoWS, then call drop probability $P_{drop}$ increases from $P_{drop}1$ to $P_{drop}2$ (indicating that the probability of dropping a call has increased). In those cases that wireless device 100 has entered a region of such low QoWS (which in this example is designated QoWS*) that call drop probability $P_{drop}$ exceeds $P_{thresh}$, then an out or range warning can be issued without further ado (this can be useful in those situations where a user has walked behind a wall, for example, where QoWS drops rapidly).

However, if mobile wireless device 100 is experiencing a decrease in QoWS (for any reason) but not of such magnitude that that call drop probability $P_{drop}$ does not exceed $P_{thresh}$, then in order to determine if an out of range warning will be issued, an estimate of an amount of time T remaining until the out of range condition is actually realized is calculated based upon the time rate of change of QoWS and the difference between the most recent value of QoWS and QoWS*. In other words, $$T = \Delta Q \times \left( \frac{1}{\left( \frac{dQ}{dT} \right)} \right) \qquad \text{Eq. (4)}$$

where d(Q)/dt is the time rate of change of QoWS and Δ Q is the difference between the most recent QoWS and QoWS*.

In this way, once notified, a user has the option to change course, stop the conversation, or any other preventive measures designed to avoid having a call dropped or mitigating the effects of an imminent dropped call. For example, if a user realizes that a current call is in imminent peril of being dropped, the user can notify the other party and hang up or warn them to expect a possible lost connection, etc.

A specific example of an implementation of the invention will now be described where the wireless network 200 is based upon Bluetooth® protocol. It should be noted that by Bluetooth® protocol it is meant a wireless protocol according to any of prior, present or future versions of a wireless protocol specification promulgated by the Bluetooth® SIG, Inc. or its equivalent and/or successor organizations.

In a Bluetooth® based wireless network, communication between any two wireless devices can be thought of as occurring in four layers, a physical link layer, a logical link layer, a data link layer, and an application layer. The physical link can be formed between any two devices that transmit packets between them and can also be used as a transport for one or more logical links. The logical link layer (that can be thought of as being "above" the physical layer) supports, for example, uni-cast synchronous, asynchronous and isochronous traffic, as well as broadcast traffic. It should be noted that traffic on logical links can be multiplexed onto the physical link layer by occupying slots assigned by a scheduling function in the resource manager. The data link layer ("above" the logical link layer) includes a Logical Link Control and Adaptation Layer (also referred to as L2CAP) that provides a channel-based abstraction to applications and services and can carries out segmentation and reassembly of application data and multiplexing and de-multiplexing of multiple channels over a shared logical link. The application layer ("above" data link layer) includes one or more applications that, according to the Bluetooth® protocol, can be the end user and/or originator of the data being transmitted.

In an embodiment of the invention, an indication of communication activity at any of the layers (such as an error rate of the communication at that layer) can be used as the underlying quality metric for a Bluetooth® based wireless network. One such communication activity that can be used as an underlying quality metric for a Bluetooth based wireless network is the L2CAP "Echo Request" command and corresponding L2CAP "Echo Response" command. As set forth in the Bluetooth® L2CAP specification, Echo requests are used to request a response from a remote L2CAP entity. These requests can be used for testing the wireless link or for passing vendor specific information using the optional data field. The Bluetooth® protocol requires that L2CAP entities respond to a valid Echo Request packet with an Echo Response packet upon receiving a valid Echo Request that matches the identifier sent in the Request. An error rate statistic can generated based on Echo Request packets and the relative number of Echo Response packets for a particular time period (a number of L2CAP Echo Response packets actually received relative to the number of L2CAP Echo Request commands sent). This "ping" and "ping response" model (such as that provided by L2CAP Echo Request and L2CAP Echo Response) can be used for any of a number of other multilayer wireless communication protocols. In this way, a Bluetooth wireless device can ascertain current wireless signal quality and a time rate of change of signal quality using the L2CAP Echo/Response model.

Figure 7:
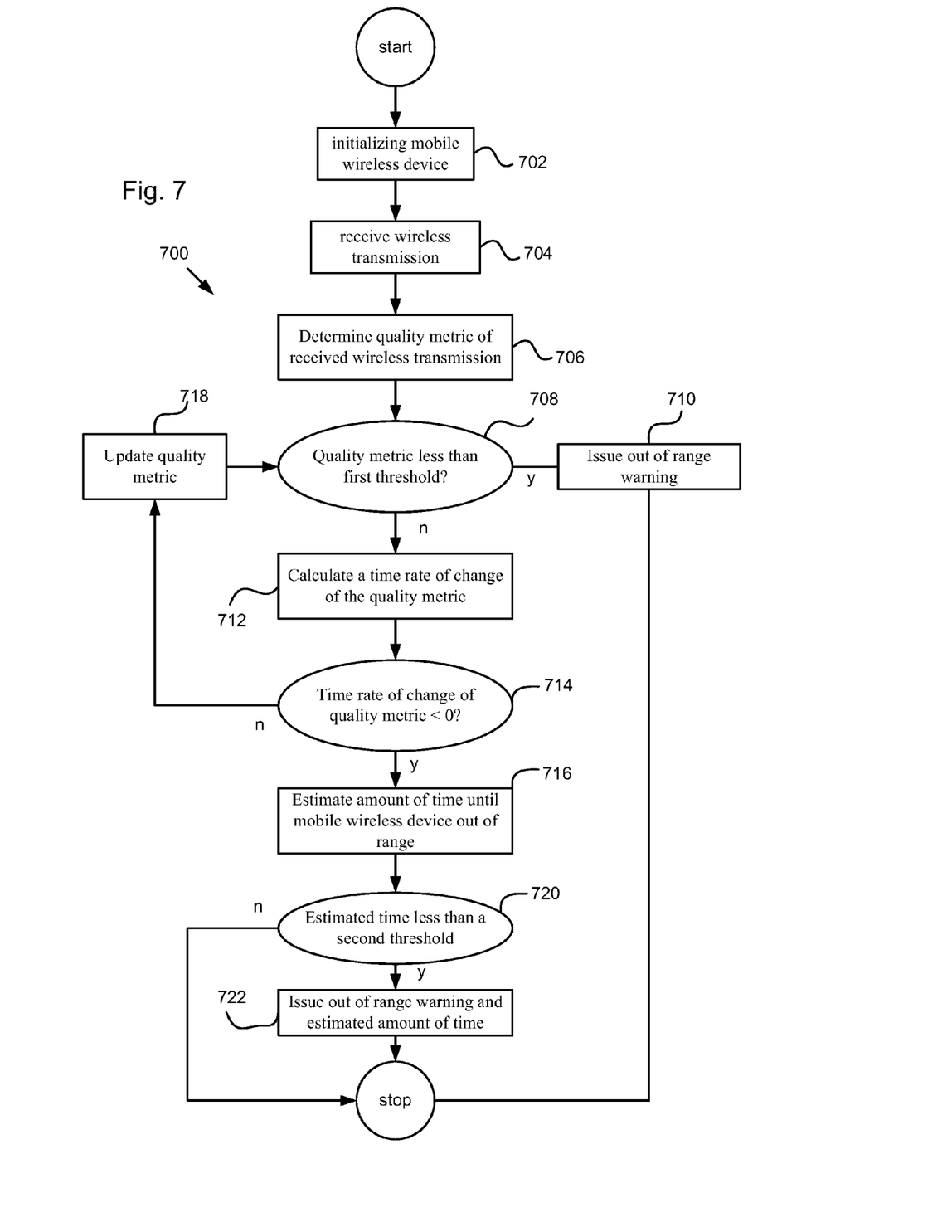
FIG. 7 shows a flowchart detailing a process for providing an out of range warning in accordance with an embodiment of the invention.

FIG. 7 shows a flowchart detailing a process 700 for providing an out of range warning in accordance with an embodiment of the invention. Process 700 begins at 702 by initializing a mobile wireless device by, for example, powering up the device, allowing the device to register itself in the wireless network in which it is embedded, displaying all graphical user interfaces, updating voicemail indicators, etc. Once the mobile wireless device has been initialized, at 704 a wireless transmission is received and at 706 a quality metric of the received wireless digital transmission is determined. At 708, if the quality metric is less than a first threshold, then an out of range warning is issued at 710, otherwise at 712 a time rate of change of the quality metric is calculated. If at 714, the time rate of change of the quality metric less than zero, then at 716, an estimate of an amount of time remaining until the wireless device is likely to be out of range of the wireless communication system is calculated, otherwise, the quality metric of the received wireless transmission is updated at 718. At 720, if the estimate of the amount of time remaining until the wireless device is likely to be out of range of the wireless network is less than a second threshold, then at 722 an out of range warning that includes a corresponding amount of time until the wireless device is out of range of the wireless network is issued, otherwise it is not.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of providing an out of range warning by a wireless device with respect to a wireless network, comprising:
   receiving a wireless transmission;
   determining a current quality metric for the received wireless transmission;
   estimating a period of time until the wireless device is out of range of the wireless network;
   issuing the out of range warning that includes the estimated period of time;
   associating a time stamp with the current quality metric;
   storing the current quality metric and the associated time stamp as a previous quality metric;
   updating the current quality metric and the time stamp; and
   calculating a time rate of change of the quality metric;
   wherein the calculating the time rate of change of the quality metric, comprises:
      subtracting the updated current quality metric from the previous quality metric to form a delta quality metric; and
      dividing the delta quality metric by a time interval corresponding to difference between the current time stamp and the previous time stamp; and
   wherein calculating the estimated period of time until the wireless device is out of range of the wireless network, comprises:
      determining a difference between the current quality metric and a quality metric corresponding to the effective boundary of the wireless network; and
      dividing the difference by the time rate of change of the quality metric.

2. A method as recited in claim 1, further comprising:
   issuing the out of range warning without the estimated period of time if the current quality metric is less than a first threshold.

3. A method as recited in claim 2, wherein the first threshold value corresponds to a quality metric indicative of the wireless device approaching a wireless network effective range.

4. A method as recited in claim 1, wherein if the estimated a period of time is greater than a second threshold value corresponding to a period of time longer than which operation of the wireless device would not be substantially affected by a loss of the wireless signal, then the out of range warning is not issued.

5. A method as recited in claim 4, wherein in an inactive mode, the second threshold value is set to an inactive second threshold value.

6. A method as recited in claim 1, wherein the wireless network is a wireless communication system and wherein the wireless device is a cellular telephone.

7. A method as recited in claim 6, wherein the quality metric is based upon a wireless transmission signal strength.

8. A method as recited in claim 1, wherein the wireless network is a data packet based wireless network.

9. A method as recited in claim 8, wherein the quality metric is based upon a ping/response model error rate statistic.

10. A method as recited in claim 9, wherein the error rate statistic is related to an actual number of received response packets relative to a number of transmitted request commands for a particular period of time.

11. A method as recited in claim 1, wherein the warning is selected from a group comprising: an audible warning, a vibratory warning, a visual warning, a tactile warning, and any combination.

12. A method as recited in claim 1, wherein the wireless device is GPS enabled.

13. Computer program product executable by a processor for providing an out of range warning by a wireless device with respect to a wireless network, comprising:
    computer code for receiving a wireless transmission;
    computer code for determining a current quality metric for the received wireless transmission;
    computer code for estimating a period of time until the wireless device is out of range of the wireless network;
    computer code for issuing the out of range warning that includes the estimated period of time;
    computer code for associating a time stamp with the current quality metric;
    computer code for storing the current quality metric and the associated time stamp as a previous quality metric;
    computer code for updating the current quality metric and the time stamp; and
    computer code for calculating a time rate of change of the quality metric;
    wherein the calculating the time rate of change of the quality metric, comprises:
        computer code for subtracting the updated current quality metric from the previous quality metric to form a delta quality metric; and
        computer code for dividing the delta quality metric by a time interval corresponding to difference between the current time stamp and the previous time stamp; and
    wherein calculating the estimated period of time until the wireless device is out of range of the wireless network, comprises:
        computer code for determining a difference between the current quality metric and a quality metric corresponding to the effective boundary of the wireless network; and
        computer code for dividing the difference by the time rate of change of the quality metric; and
    computer readable medium for storing the computer code.

14. Computer program product as recited in claim 13, further comprising;
    computer code for issuing the out of range warning without the estimated period of time if the current quality metric is less than a first threshold.

15. Computer program product as recited in claim 14, wherein the first threshold value corresponds to a quality metric indicative of the wireless device approaching a wireless network effective range.

16. Computer program product as recited in claim 13, wherein if the estimated a period of time is greater than a second threshold value corresponding to a period of time longer than which operation of the wireless device would not be substantially affected by a loss of the wireless signal, then the out of range warning is not issued.

17. Computer program product as recited in claim 16, wherein in an inactive mode, the second threshold value is set to an inactive second threshold value.

18. Computer program product as recited in claim 13, wherein the wireless network is a wireless communication system and the wireless device is a cellular telephone.

19. Computer program product as recited in claim 18, wherein the quality metric is based upon a wireless transmission signal strength.

20. Computer program product as recited in claim 13, wherein the wireless network is a data packet based wireless network.

21. Computer program product as recited in claim 20, wherein the quality metric is based upon a ping/response model error rate statistic.

22. Computer program product as recited in claim 21, wherein the error rate statistic is related to an actual number of received response packets relative to a number of transmitted request commands for a particular period of time.

23. A mobile wireless apparatus arranged to issue an out of range warning with respect to a wireless network, comprising;
    a receiving unit arranged to receive a wireless transmission; and
    a processing unit coupled to the receiving unit arranged to determine a current quality metric for the received wireless transmission, estimate a period of time until the wireless apparatus is out of range of the wireless network, issue the out of range warning that includes the estimated period of time; associate a time stamp with the current quality metric; store the current quality metric and the associated time stamp as a previous quality metric; update the current quality metric and the time stamp; and calculate a time rate of change of the quality metric;
    wherein the calculating the time rate of change of the quality metric, comprises:
        subtracting the updated current quality metric from the previous quality metric to form a delta quality metric; and
        dividing the delta quality metric by a time interval corresponding to difference between the current time stamp and the previous time stamp; and
    wherein calculating the estimated period of time until the wireless device is out of range of the wireless network, comprises:
        determining a difference between the current quality metric and a quality metric corresponding to the effective boundary of the wireless network; and
        dividing the difference by the time rate of change of the quality metric.

24. An apparatus as recited in claim 23, wherein the out of range warning does not include the estimated time if the current quality metric is less than a first threshold that corresponds to a quality metric indicative of the wireless device approaching a wireless network effective range.

25. An apparatus as recited in claim 23, wherein if the estimated a period of time is greater than a second threshold value corresponding to a period of time longer than which operation of the wireless device would not be substantially affected by a loss of the wireless signal, then the out of range warning is not issued.

26. An apparatus as recited in claim 25, wherein in an inactive mode, the second threshold value is set to an inactive second threshold value.

27. An apparatus as recited in claim 23, wherein the wireless network is a wireless communication system and wherein the wireless device is a cellular telephone.

28. An apparatus as recited in claim 27, wherein the quality metric is based upon a wireless transmission signal strength.

29. An apparatus as recited in claim 23, wherein the apparatus is incorporated into a wireless portable consumer product.

30. An apparatus as recited in claim 29, wherein the wireless portable consumer product is selected from a group comprising: a cellular telephone, a wireless multimedia player, a PDA.

31. An apparatus as recited in claim 23, wherein the wireless network is a data packet based wireless network.

32. An apparatus as recited in claim 31, wherein the quality metric is based upon a ping/response model error rate statistic.

33. An apparatus as recited in claim 32, wherein the error rate statistic is related to an actual number of received response packets relative to a number of transmitted request commands for a particular period of time.

* * * * *

UNITED STATES PATENT AND TRADEMARK OFFICE
CERTIFICATE OF CORRECTION

PATENT NO. : 7,630,707 B2  Page 1 of 1
APPLICATION NO. : 11/563655
DATED : December 8, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Second Day of November, 2010

David J. Kappos
*Director of the United States Patent and Trademark Office*